Dec. 17, 1968 R. C. BRIDGEMAN 3,416,356
DEW POINT HYGROMETER
Filed Dec. 17, 1965 4 Sheets-Sheet 1

INVENTOR
RICHARD C. BRIDGEMAN
BY
ATTORNEY

INVENTOR
RICHARD C. BRIDGEMAN

BY

ATTORNEY

INVENTOR
RICHARD C. BRIDGMAN

BY [signature]

ATTORNEY

Dec. 17, 1968 R. C. BRIDGEMAN 3,416,356
DEW POINT HYGROMETER
Filed Dec. 17, 1965 4 Sheets-Sheet 4
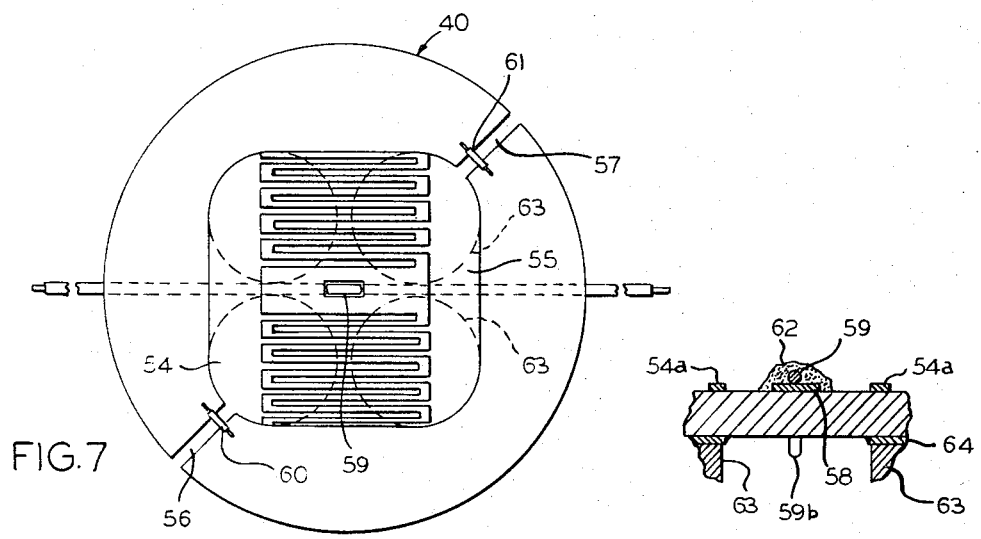
FIG.7 FIG.10
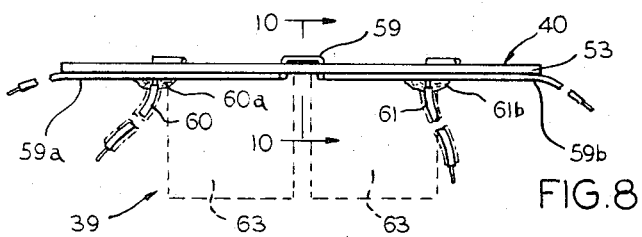
FIG.8
FIG.9
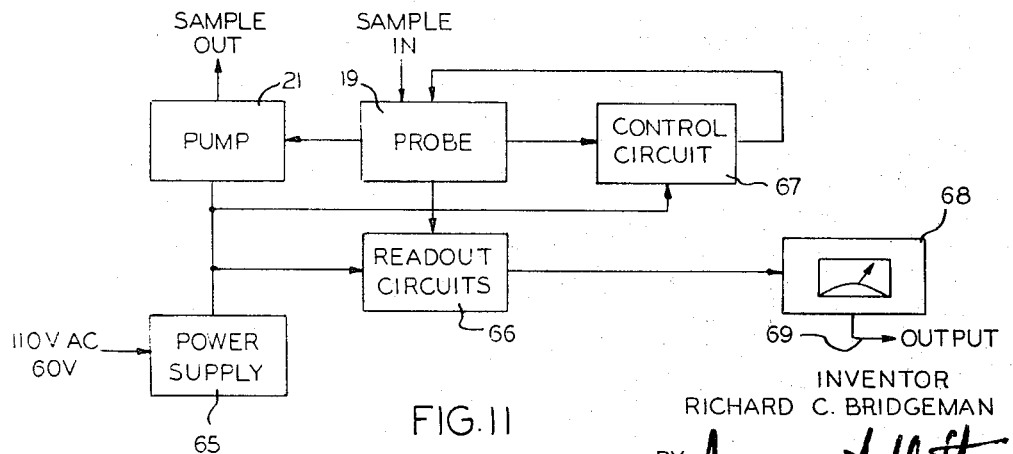
FIG.11
INVENTOR
RICHARD C. BRIDGEMAN
BY _[signature]_
ATTORNEY

United States Patent Office 3,416,356
Patented Dec. 17, 1968

3,416,356
DEW POINT HYGROMETER
Richard C. Bridgeman, Northbrook, Ill., assignor to Vapor Corporation, Chicago, Ill., a corporation of Delaware
Filed Dec. 17, 1965, Ser. No. 514,557
11 Claims. (Cl. 73—17)

ABSTRACT OF THE DISCLOSURE

Dew point hygrometer for continuously determining the dew point temperature of a gas including a sensing element for sensing the conductivity of the gas and operating a heat exchanger to maintain the sensing element temperature a predetermined amount above the dew point temperature of the gas, and means for reading the temperature of the sensing element and translating same into the dew point temperature.

---

This invention relates in general to a device that can accurately and reliably measure and indicate the dew point of an inaccessible gas, and more particularly to a dew point hygrometer for receiving a gas sample and measuring the vapor condition of the gas to indicate the dew point temperature thereof.

Heretofore, many dew point hygrometers have been developed, but all have encountered difficulties in accurately and quickly measuring the dew point temperature of a gas, and have further experienced difficulty in maintaining consistent accuracy because of contamination problems. Therefore, there has not been heretofore provided a satisfactory device for indicating dew point temperature of an inaccessible gas.

It is therefore an object of this invention to provide a dew point hygrometer that obviates the above mentioned difficulties.

It is a further object of this invention to provide a new and improved dew point hygrometer capable of constantly and continually indicating the dew point temperature of an inaccessible gas.

A still further object of this invention resides in the provision of a dew point hygrometer having high inherent reliability, while requiring a minimum amount of maintenance.

Another object of this invention is to provide a dew point hygrometer that is highly accurate, substantially immune to contamination, and quickly responsive to the changing of the vapor condition of a gas.

Still another object of this invention is in the provision of a dew point hygrometer having a sensor and sensor assembly that is easily and quickly replaceable, maintainable and cleanable, while being highly sensitive to the vapor condition of a gas.

A further object of this invention resides in the provision of a self-contained dew point hygrometer for indicating the dew point temperature of a gas, wherein the hygrometer need only be connected to a source of electrical power and a source of the gas being measured, and which also may be remotely positioned from the actual gas flow.

A still further object of this invention resides in the provision of a dew point hygrometer that is quickly responsive to changing vapor conditions of a gas, and which tracks the dew point temperature of the gas.

Another object of this invention resides in the provision of a dew point hygrometer employing a probe having a sensor for responding to the vapor condition of a gas, means for maintaining the sensor at a predetermined temperature above the dew point temperature of the gas, and means for reading out the temperature of the sensor and compensating for the difference between the temperature of the sensor and actual dew point temperature to provide same on a visual readout device.

A still further object of this invention is to provide a dew point hygrometer including a gas sampling chamber assembly having a probe therein for sensing the vapor condition of a gas, and means for pumping gas through said chamber assembly while first being detected by the probe.

Other objects, features and advantages of the invention will be apparent from the following detailed disclosure, taken in conjunction with the accompanying sheets of drawings, wherein like reference numerals refer to like parts, in which:

FIG. 7 is an enlarged plan view of the sensor element but smaller than the view of FIG. 6 and further illustrating the electrical connections and association with the thermoelectric module;

FIG. 8 is an elevational view of the sensor element as shown in FIG. 7;

FIG. 9 is a further elevational view of the sensor element shown in FIG. 7 and taken along the line 9—9 of FIG. 7;

FIG. 10 is an enlarged detail sectional view taken substantially along line 10—10 of FIG. 8; and FIG. 11 is a block diagram of the dew point hygrometer of the present invention.

The dew point hygrometer of the present invention, as illustrated, includes a sampling chamber assembly through which may be pumped by a self-contained pumping unit a continuous sample of gas. A probe in the assembly detects the vapor condition or content of the gas by cooling the gas to a predetermined temperature above dew point temperature and reading the temperature of the gas and correcting it to dew point temperature. The probe may also be directly mounted in a duct or line conveying a gas and remotely indicates the dew point temperature. The probe includes a sensor board or plate having a pair of conductive surfaces or conductors thereon and a temperature measuring unit. The sensor board is mounted on a thermoelectric module or heat exchanger operable to heat or cool the sensor board in response to the conductivity measured between the conductive surfaces and through suitable control circuitry. A suitable resistance bridge circuit in which the conductive surfaces are arranged sends an output signal to suitable control circuits for operating the thermoelectric module. The resistance circuit is constructed to balance when the vapor condition of the gas at the surface of the sensor is at a predetermined point above dew point temperature, preferably about 5° F. Compensation circuits translate this information to one or more outputs of the dew point hygrometer in terms of dew point temperature. Thus, the hygrometer includes a control that will translate the conductivity measurements of the sensor surface into thermoelectric module current so that the sensor is kept exactly at a predetermined temperature above dew point temperature, and means to measure the temperature of the sensor. Moreover, it can be appreciated that the vapor content of a gas is a function of the conductivity measured across the sensor surface by the conductive surfaces thereon.

The sampling chamber assembly including a pump enables the hygrometer to supply a fast sampling rate to the sensor, and further permits the gas to be at elevated pressure and wherein the sample gas may be returned to the source or exhausted to atmosphere.

Figure 1:
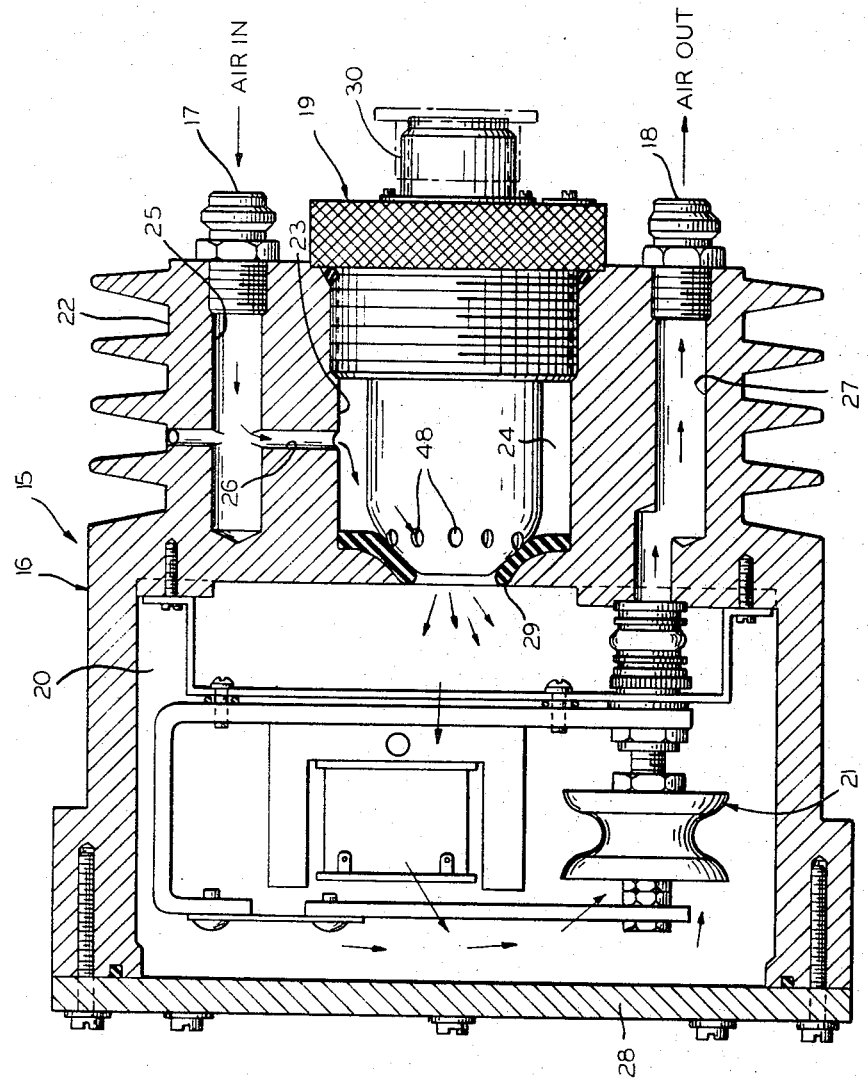
FIG. 1 is an axial sectional view taken through the sampling chamber assembly of the present invention which includes the probe for detecting the vapor condition of a gas.
Figure 2:
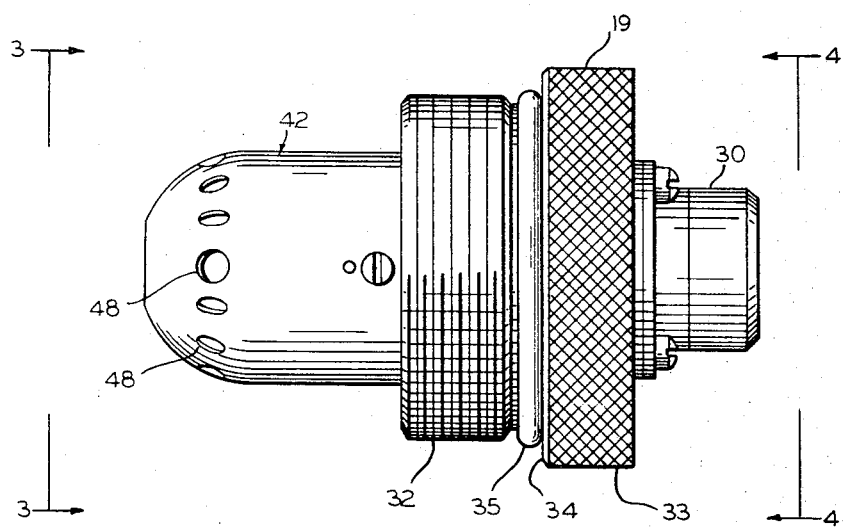
FIG. 2 is a longitudinal view of the probe employed in the assembly of FIG. 1 but removed therefrom.
Figure 3:
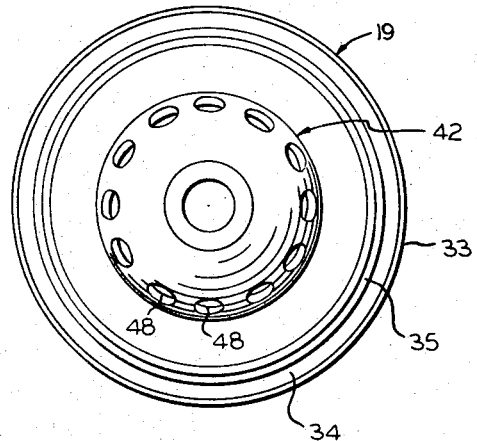
FIG. 3 is an end elevational view of the sensing or input end of the probe of FIG. 2.
Figure 4:
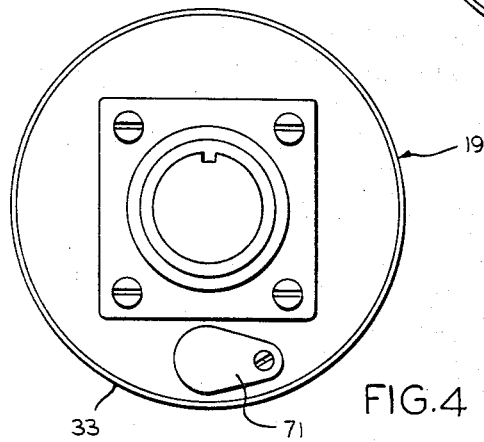
FIG. 4 is an end elevational view of the electrical connector or output end of the probe of FIG. 2.

Referring now to the drawings, and particularly to FIG. 1, the sampling chamber assembly of the dew point hygrometer of the present invention, generally indicated by the numeral 15, includes a sampling chamber casing or body 16 having a gas inlet 17, a gas outlet 18, a probe 19 for detecting the vapor condition of a gas, a pump chamber 20, and a pump 21 for drawing gas into the gas inlet 17, through the probe 19, the pump chamber 20 and out the gas outlet.

The casing 16 includes a finned head 22 having a partially threaded bore 23 functioning as the probe receiver to threadedly receive the probe 19, and define with the probe a sampling chamber 24. This chamber 24 is interconnected with the gas inlet 17 by a blind bore 25 and a small connecting passageway 26. The gas therefore flows into the inlet 17 through the bores 25 and 26 and into the chamber 24. It should be appreciated that the gas inlet 17 would be connected to a source of gas such as that in a pipe line, and that the gas outlet 18 could also be connected to the same source, wherein the sampling chamber assembly would withdraw samples of the gas and return same to the source, or, if desired, through an appropriate throttling valve return to atmosphere.

The gas flows from the sampling chamber 24, through the sensing end of the probe 19, in a manner hereinafter more clearly explained, and on into the pump chamber 20. The pump 21 therein is of a type that may be operated by a vibratory motor, although it should be appreciated that any suitable pump may be employed to draw samples from a source for testing purposes. Inasmuch as the form of the pump 21 employed is of no patentable significance to the present invention, it need only be said that the pump operates to take the gas from the pump chamber 20 and pump it out of the sampling chamber through a bore 27 and the gas outlet 18. However, the pump 21 would be of a type that would not allow the sample gas to back up through the probe 19, and therefore a new sampling of gas is continually being taken while the sampling chamber assembly is in operation. A cover plate 28 is secured by suitable fasteners to close the pump chamber 20, and to allow access thereinto for servicing of the pump 21. A flexible annular gasket 29 coacts with the sensing end of the probe and the casing to seal the pump chamber 20 from the sampling chamber 24. The sampling chamber assembly will be constructed with suitable sealing means to prevent leakage of gas therefrom, and of sufficient strength to handle pressurized gas within said limitations. A suitable fan or air moving device (not shown) may be arranged to deliver a supply of air across the finned head 22 to take away the heat dissipated by the hot side of the thermoelectric module mounted within probe 19. Suitable piping and/or hose may be connected to the fittings on the gas inlet and outlet to connect the sampling chamber assembly to a source of gas supply. Further, a suitable connector half 30 is provided on the probe 19 for connection to the electrical circuit means employed for the probe 19. Because the operation of the probe and information received therefrom is delivered through the connector half 30, it can be appreciated that this control and readout circuitry may be remotely located relative to the sampling chamber assembly for convenience in reading out of the information provided.

The probe 19 includes a body 31 of suitable material, such as a light-weight metal like aluminum, and which includes a threaded portion 32 that threadedly engages in the bore 23 of the sampling chamber body. The threaded portion 32 defines with a larger cylindrical portion 33 a shoulder 34 that abuts against the sampling chamber body when the probe is in proper position. An O-ring gasket 35 serves to coact between the body of the probe and the sampling chamber body to prevent leakage of the gas from the sampling chamber. The cylindrical portion 33 is preferably knurled or roughened to enable one to easily grasp same and remove the probe from the sampling chamber body for inspection and/or maintenance. A reduced cylindrical portion 36 extends coaxially with the threaded portion 32 and coacts therewith to define a shoulder 37.

A transversely extending face or platform 38 is defined on the end of the reduced cylindrical portion 36, and a thermoelectric module 39 is suitably mounted thereon. The thermoelectric module 39, sometimes referred to as a cooler, is a current operated device for providing a heated or cooled source, and may be of any desirable type, such as the well known Peltier type. A sensor element 40 is mounted on the output end of the thermoelectric module 39 and suitably secured thereto. The sensor element functions to measure the conductivity across its surface between the conductive surfaces, and thereby drive the thermoelectric module to maintain the sensor element at a predetermined temperature above dew point temperature of the gas impinging thereon.

A sensor shield 41 arranged over the sensor element 40 and the thermoelectric module 39, is held in place by a probe cap 42, and coacts therewith to define the path of movement of the gas to be tested. While the sensor shield and cap probe may be made of any suitable material, it is preferably made of a suitable plastic such as Delrin.

The sensor shield 41 is in the form of a cylindrical sleeve, the outer diameter being such as to be slidably received within the probe cap 42 but in close mating relation therewith. The shield is bottomed against the platform 38 and held in oriented position by the probe cap 42. An inwardly extending radial portion 43 is provided at the end opposite the end that is bottomed on the platform 38, and terminates inwardly with a lip 44 that extends inwardly to overlap the outer edge portion of the sensor element 40. The lip 44 thus restricts the area across the sensor element face from the area about the thermoelectric module 39.

The probe cap 42 fits over the sensor shield 41, and therefore includes a cylindrical section 45 that also is telescopically received over the cylindrically reduced portion 36 of the probe body 31. The outer end of the probe cap is somewhat dome-shaped and provided with a somewhat annular thickened portion 46 that coacts with the sensor shield to define an annular conically-shaped inlet passage 47. The inlet passage is defined by the conical surface 47a of the sensor shield and the opposed conical surface 47b of the probe cap. A plurality of circumferentially spaced inlet openings 48 are provided in the probe cap and in alignment with the inlet passageway 47. An axially aligned outlet opening 49 extends from the inner end of the thickened portion 46 to the outside of the probe cap, and is in alignment with the sensor element 40. The inclination of the inlet passage 47 assures that the gas being drawn through the inlet openings 48 impinges upon the sensor element 40 before discharging through the outlet opening 49. By a wedging action, the probe cap 42 holds the sensor shield in place against the platform 38. The probe cap is then fastened to the probe body 31 by means of a pair of fasteners 50. Inasmuch as condensation may form about the thermoelectric module 39 within the sensor shield, a plurality of weep holes 51 are provided in the sensor shield 41 and which are in alignment with weep holes 52 provided in the probe cap 42 to allow some circulation of air within the area about the thermoelectric module.

Referring now to FIGS. 6-10, the sensor element includes a printed circuit board employing a disc-shaped board 53 of a suitable material that is non-absorbing and having a low electrical conductivity. Preferably the board is of glass epoxy although other materials may be employed. The board should have a suitable thermal capacity consistent with good response, be inert to common chemicals, and also strong and readily cleanable. A pair of electrical conductive surfaces 54 and 55 are formed on the board by the usual printed circuit process. The conductive surface 54 is provided with a plurality of spaced fingers 54a arranged interjacently with a plurality of like spaced fingers 55a of the conductive surface 55 to thereby define a potential grid on the face of the board 53. Conductive surface connecting legs 56 and 57 extend from the conductive surfaces 54 and 55, respectively, for connecting same to suitable electrical conductors and into associated circuitry. While the conductive surfaces 54 and 55 would serve well for electrical conduction if of copper, such would not stand up under the gas flow impinging thereagainst, and therefore the conductive surfaces 54 and 55 are clad or coated with a noble metal that is inert, such as gold. The surface comprising gold clad copper conductive surfaces and the board are manufactured as smooth as possible to enhance speed of sensor response and cleanliness.

In order to facilitate connection of conductive surfaces to the connecting legs 56 and 57, holes 56a and 57a are provided, respectively, on opposite sides of the legs and through which a conductor may be inserted from the bottom side of the board and suitably secured thereto such as by soldering. The exposed portions of the conductors 60 and 61 on the bottom of the board and the holes 56a and 57a are coated with a water repellent material 60a and 61a to prevent conductive measurements on the bottom side of the sensor board. A rectangularly shaped copper pad 58 is arranged centrally of the board and of the conductive surface grid for securing to the board on the sensing face thereof a thermocouple sensing unit 59. A pair of lead holes 60b are provided through the pad and board so that the sensing unit conductors may be inserted therethrough from the underside of the board as particularly shown in FIG. 8. While any type of thermocouple sensing unit may be employed, it has been found that a copper-constantan thermocouple is satisfactory. Also as shown in FIG. 8 and in FIG. 9, conductors 60 and 61 are provided for connection to the conductive surface legs 56 and 57.

The thermocouple junction or sensing unit 59 is arranged on the pad 58 on the upper face of the sensing unit, and is suitably soldered thereto to secure it in position. Thereafter, a coating 62 of insulative material, such as varnish, is applied over the sensing unit 59 and the pad 58 to completely seal in the thermocouple and pad, including the areas about the leads extending through the openings 60. The thermocouple sensing unit is thusly secured tightly against the sensor board, and the insulative coating is also protective and preferably not susceptible to solvents used to clean the board. Leads 59a and 59b extend below the board 53 and are arranged to be received in gaps provided by the upstanding cylindrical pedestals 63 of the thermoelectric module 39 so that the sensor board 53 can engage tightly against the upper ends of the pedestals 63. In order to assure proper placement of the sensor element on the module so that the pedestals are directly below the conductive surfaces 54 and 55 as especially shown in FIG. 7, the sensor board 53 is preferably secured to the pedestal 63 by a suitable adhesive 64, such as an epoxy.

Figure 5:
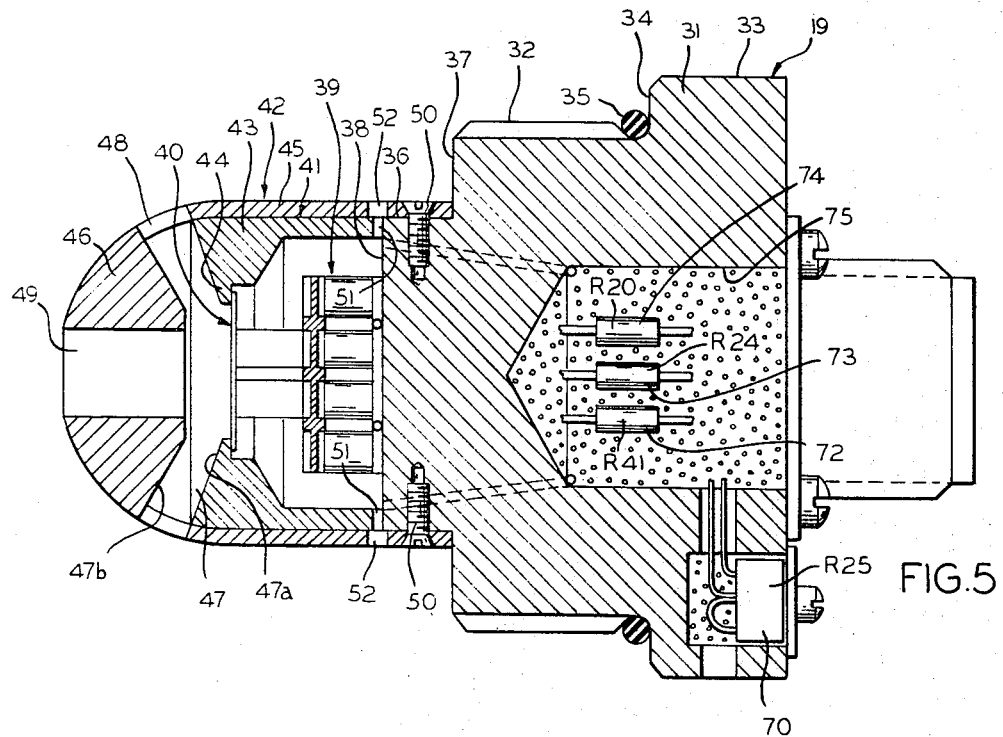
FIG. 5 is an axial sectional view taken through the probe of FIG. 2.
Figure 6:
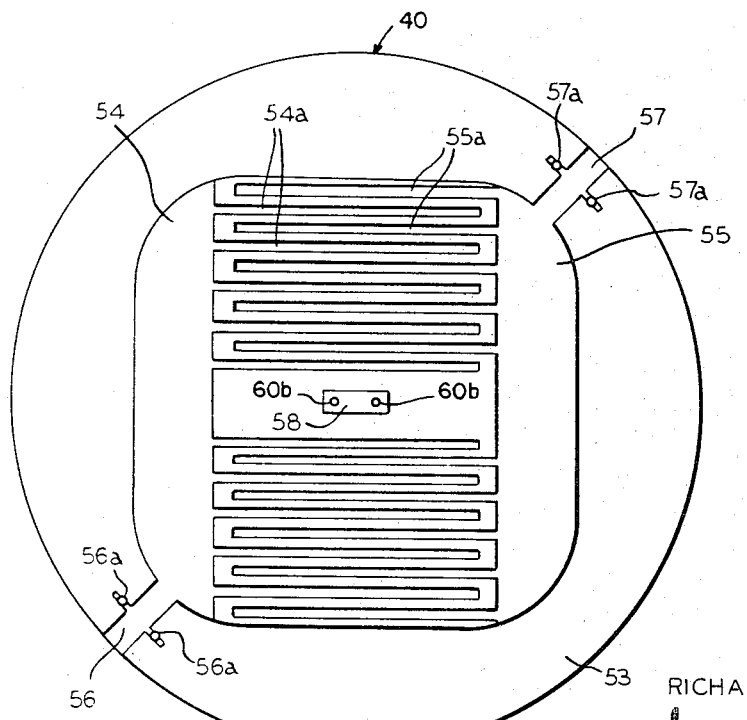
FIG. 6 is an enlarged plan view of the sensor element wherein the connecting leads are omitted for purpose of clarity.

Referring now to FIG. 11, the block diagram illustrates the general operation of the hygrometer of the present invention, wherein a power supply 65 is provided to power the pump 21, readout circuits 66, and the control circuit 67. A readout meter 68 may be provided along with other readout outputs 69 to indicate or record the dew point temperature of a gas being pumped through the probe 19 by the pump 21. While a gas to be tested is being pumped through the probe 19, the conductivity across the sensor surface is measured and this information is translated to the control circuit that in turn operates the thermoelectric module in the probe to bring the sensor element to a temperature that causes a vapor condition on the sensor element surface having a predetermined conductivity to balance the resistance bridge circuit. The temperature of the sensor element is read out by the thermocouple in the readout circuits and thereafter translated into an indicating temperature of the dew point of the gas. The resistance bridge is calibrated by the readout circuits and a variable resistor 70 arranged in the probe body 31, FIG. 5, which resistor is normally covered by an access plate or cover 71. Other resistors for the bridge circuit, as indicated by the numerals 72, 73 and 74, may be arranged in a cavity 75 in the probe body that is thereafter filled with a suitable sealant material 76. Preferably, the resistance bridge circuit will be calibrated so that the sensor element operates at a temperature of about 5° F. above the dew point temperature. Operating above dew point temperature enables quick response of the sensor element which tracks the dew point temperature.

It will be understood that modifications and variations may be effected without departing from the scope of the novel concepts of the present invention, but it is understood that this application is to be limited only by the scope of the appended claims.

The invention is hereby claimed as follows:

1. In a dew point hygrometer, a gas sampling chamber having an inlet and an outlet, means pumping a gas through said inlet and sampling chamber and out the outlet, and means for continually sensing and detecting the vapor condition of gas pumped through said sampling chamber, said sensing and detecting means including a sensor element having a board of insulative material one side of which is exposed to the gas in the sampling chamber, a pair of spaced conductors on said one side between which current flow is established by the gas impinging thereon in direct relation to the vapor content thereof, a balancing circuit having the spaced conductors connected therein, a heat exchanger having its output end in engagement with the other side of said sensor board and being operated in response to the output of the balancing circuit, means adjusting said balancing circuit to cause operation of said heat exchanger and maintain the temperature of the sensor board at a predetermined value above dew point temperature in response to the vapor condition of the gas, and means for measuring the temperature of said board and translating same into the dew point temperature of the gas.

2. In a dew point hygrometer as defined in claim 1, wherein main conductor includes a plurality of finger conductors spaced from each other, and the finger conductors of one conductor being interjacently arranged with the finger conductors of the other conductors to define a grid-like conductor arrangement.

3. In a dew point hygrometer as defined in claim 2, wherein said heat exchanger includes a thermoelectric module having its output end firmly secured to the other side of the sensor board in direct alignment with the positions of the grid-like conductor arrangement.

4. In a dew point hydrometer as defined in claim 3, and a coating of insulative and protective material over said thermocouple.

5. In a dew point hygrometer as defined in claim 1, said temperature measuring means includes a thermocouple, and said thermocouple being secured to the surface of said sensor element exposed to the gas flow.

6. In a dew point hygrometer as defined in claim 1, wherein said predetermined value is between 5 and 8 degrees F.

7. In a dew point hygrometer as defined in claim 1, wherein said predetermined value is at least 5 degrees F.

8. In a dew point hygrometer as defined in claim 1, wherein said predetermined value is 8 degrees F.

9. In a dew point hygrometer as defined in claim 1, and means for directing the gas toward said sensor board along a path inclined relative thereto and away from said board along a path perpendicular thereto.

10. In a dew point hygrometer as defined in claim 1, and means for directing the gas toward said sensor board along a plurality of radially arranged paths inclined relative thereto and away from said board along a path perpendicular thereto.

11. In a dew point hygrometer, means for continually sensing and detecting the vapor condition of gas including a sensor element having a board of insulative material one side of which is exposed to the gas, a pair of spaced conductors on said one side between which current flow is established by the gas impinging thereon in direct relation to the vapor content thereof, a balancing circuit having the spaced conductors connected therein, a heat exchanger having its output end in engagement with the other side of said sensor board and being operated in response to the output of the balancing circuit, means adjusting said balancing circuit to cause operation of said heat exchanger and maintain the temperature of the sensor board at a predetermined value above dew point temperature in response to the vapor condition of the gas, and means for measuring the temperature of said board and translating same into the dew point temperature of the gas.

References Cited

UNITED STATES PATENTS

| | | | |
|---|---|---|---|
| 2,764,016 | 9/1956 | Benedick | 73—17 |
| 2,975,638 | 3/1961 | Morrison | 73—336.5 |
| 3,083,573 | 4/1963 | Shaw | 73—336.5 |
| 3,175,400 | 3/1965 | Amdur | 73—336.5 |
| 3,247,478 | 4/1966 | Craig | 338—35 |
| 3,319,457 | 5/1967 | Leone | 73—17 |

RICHARD C. QUEISSER, *Primary Examiner.*

E. D. GILHOOLY, *Assistant Examiner.*

U.S. Cl. X.R.

73—336.5